US008470234B2

(12) United States Patent
Clark

(10) Patent No.: US 8,470,234 B2
(45) Date of Patent: Jun. 25, 2013

(54) SUPPORT ARCHITECTURE

(75) Inventor: Daniel Clark, Derby (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 12/219,069

(22) Filed: Jul. 15, 2008

(65) Prior Publication Data

US 2009/0039570 A1     Feb. 12, 2009

(30) Foreign Application Priority Data

Aug. 10, 2007  (GB) .................................. 0715621.9

(51) Int. Cl.
*B29C 35/08*         (2006.01)
*C04B 35/653*        (2006.01)

(52) U.S. Cl.
USPC ........... 264/497; 264/109; 264/113; 264/118; 264/460; 264/463

(58) Field of Classification Search
USPC ................. 264/497, 109, 113, 118, 460, 463
See application file for complete search history.

(56) References Cited

U.S. PATENT DOCUMENTS

| | | | | | |
|---|---|---|---|---|---|
| 4,129,290 | A | * | 12/1978 | Popper | 267/160 |
| 4,818,562 | A | * | 4/1989 | Arcella et al. | 427/597 |
| 4,841,772 | A | * | 6/1989 | Paik | 73/382 G |
| 4,961,154 | A | * | 10/1990 | Pomerantz et al. | 345/419 |
| 4,999,143 | A | * | 3/1991 | Hull et al. | 264/401 |
| 5,155,324 | A | * | 10/1992 | Deckard et al. | 264/497 |
| 5,156,697 | A | * | 10/1992 | Bourell et al. | 264/497 |
| 5,595,703 | A |   | 1/1997 | Swaelens et al. | |
| 5,866,058 | A | * | 2/1999 | Batchelder et al. | 264/237 |
| 5,897,825 | A |   | 4/1999 | Fruth et al. | |
| 5,980,813 | A | * | 11/1999 | Narang et al. | 264/401 |
| 6,027,630 | A | * | 2/2000 | Cohen | 205/135 |
| 6,409,902 | B1 | * | 6/2002 | Yang et al. | 205/70 |
| 6,508,980 | B1 | * | 1/2003 | Sachs et al. | 419/45 |
| 2003/0183008 | A1 | * | 10/2003 | Bang et al. | 73/514.01 |
| 2004/0207124 | A1 | * | 10/2004 | Kritchman et al. | 264/401 |
| 2004/0239009 | A1 |   | 12/2004 | Collins et al. | |
| 2005/0186361 | A1 | * | 8/2005 | Fukuda et al. | 428/15 |

FOREIGN PATENT DOCUMENTS

EP    0 686 480 A2    12/1995

OTHER PUBLICATIONS

Wikipedia "Spring (device)" page; http://en.wikipedia.org/wiki/Spring_%28device%29.*

* cited by examiner

*Primary Examiner* — Milton I Cano
*Assistant Examiner* — Jeremiah Smith
(74) *Attorney, Agent, or Firm* — Oliff & Berridge, PLC

(57) ABSTRACT

A method of forming a component from solid freeform fabrication comprising the step of building an integral support around the component during manufacture thereof. The stiffness the support provides to the component is selected to minimize deformation of the component either during the manufacture of the component or during a subsequent heat treatment process.

11 Claims, 2 Drawing Sheets

SUPPORT ARCHITECTURE

This invention relates to support architecture for directly formed structures using high temperature solid freeform fabrication and in particular support architecture for components formed directly through powder bed processing.

Solid freeform fabrication (SFF) techniques are methods which allow the manufacture of solid objects by the sequential delivery of energy and/or material to specified locations to produce that object. SFF is sometimes referred to as rapid prototyping, rapid manufacturing, layered manufacturing and additive manufacture.

A number of low temperature techniques are known in the art including: three-dimensional printing using an inkjet-type printhead to deposit phase change material in layers, stereolithography which uses a laser to cure liquid photopolymers, fused deposition modelling which extrudes hot plastic through a nozzle. These methods are useful for forming plastic components, typically at a temperature of the order 150° C. or below.

The major stresses within an article during manufacture by these methods are caused by the surface tension effects of liquid in stereolithograpic processes and the weight of the article, particularly where it has features which are thin and overhang a void.

It is desirable, and known, to support overhangs or drafted surfaces using support pillars or girders e.g. in EP686480, U.S. Pat. No. 5,595,703, US20040239009 and U.S. Pat. No. 5,897,825. These compressively support against the action of gravity and prevent the component from bowing during manufacture. The supports are removed following manufacture.

High temperature SFF techniques are also known in the art. One method, direct laser deposition, uses a laser to melt metal from a wire or powder and deposit it on the part directly. Selective laser sintering or powder bed processing uses a laser or other heat source to fuse powdered metal layered in a bed of the material.

The deposition apparatus for direct laser deposition as shown in FIG. 1 consists of a base 12 onto which a component 14 is formed. A laser 16 is directed towards the component and forms a melt pool 18 in the upper surface thereof. A powder head 20 directs a stream of metal powder towards the melt pool into a deposition location. The powder is melted by the heat from the laser which translates relative to the component.

As the laser moves from the deposition location the melted powder cools to form a deposit with a height. By making repeated deposition passes of the laser over the component it is possible to increase the height of the deposit and thereby build a component having a complex structure.

A further high temperature SFF apparatus for forming a component using a powder bed is depicted in FIG. 2. The powder bed consists of a deposition container 30 having walls 32 and a base 34. The base 34 may be lowered in steps to increase the deposition height. With the base 34 below the height of the walls 32 a distance equal to one layer height a layer of powder 36 is supplied to the container and levelled using a blade 38. A laser 40 is translated across the surface of the bed and consolidates the powder at selected locations. The base 34 is then indexed a distance equal to one layer height and the process is repeated.

A key limiting feature of powder bed processing is the build up of thermally induced stresses and the associated thermal shrinkage contraction, which affects dimensional accuracy and stability. The levelling blade must be relatively robust to be able to move the powder and this can result in damage to the manufactured article.

Often components produced by high temperature SFF require additional processing e.g. thermal processing stress relief, polishing or machining.

It is an object of the present invention to seek to provide an improved support for reducing stress or damage within a component formed by high temperature SFF.

It is a further object of the invention to seek to provide an improved support integrally formed with a component that enables simpler post processing of the component.

According to a first aspect of the invention there is provided a method of forming an article from high temperature solid freeform fabrication comprising the step of building a support for the article during manufacture of the article characterised in that at least a portion of the article is held in tension by the support and the stiffness the support provides to the article is selected to inhibit permanent thermal deformation of the article.

Preferably the deformation to be prevented is warping or cracking.

Preferably the support provides at least a region of relatively high stiffness or low elasticity for reacting expansion, contraction or twisting of the component.

Preferably the support provides at least one region of relatively low stiffness or high elasticity permitting expansion or contraction of the component.

Preferably the deformation is caused by heating or cooling.

Preferably the heating or cooling is performed during manufacture of the component by the high temperature solid freeform fabrication.

Preferably the heating or cooling is performed during heat treatment following manufacture of the component by the high temperature solid freeform fabrication.

The support may comprise an outer frame connected to the component by struts. The struts may be omega springs or linear. Where the struts are linear preferably they are arranged at angles other than 90° between the frame and the component. Two dimensional omega springs are preferred as they are simple to draw and hence it is easier to plan the tool path based on two dimensional slicing techniques. With more sophisticated algorithms, twist i.e. helical or bow springs could be formed. Such springs help offset more complex three dimensional distortions.

The population density of the struts may vary around the component.

The integral support may be built around a plurality of components.

The component may undergo a post-manufacture processing wherein the arrangement of struts is altered following manufacture of the component by solid free form fabrication and before the post-manufacture processing.

Preferably the arrangement of struts is altered by breaking one or more of the struts.

Preferably the solid freeform fabrication is a powder bed process.

Embodiments of the invention will now be described by way of example only, with reference to the accompanying drawings, in which.

Figure 1:
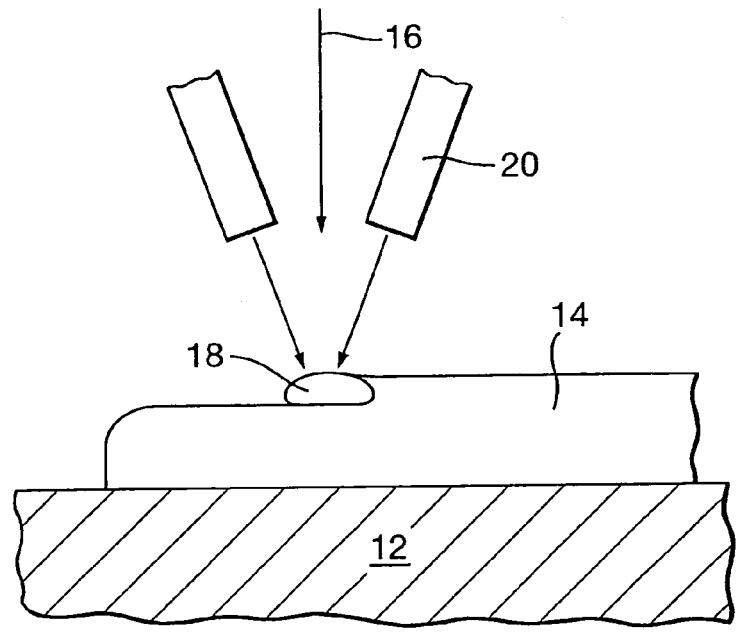
FIG. 1 depicts a method of depositing a component by direct metal deposition.
Figure 2:
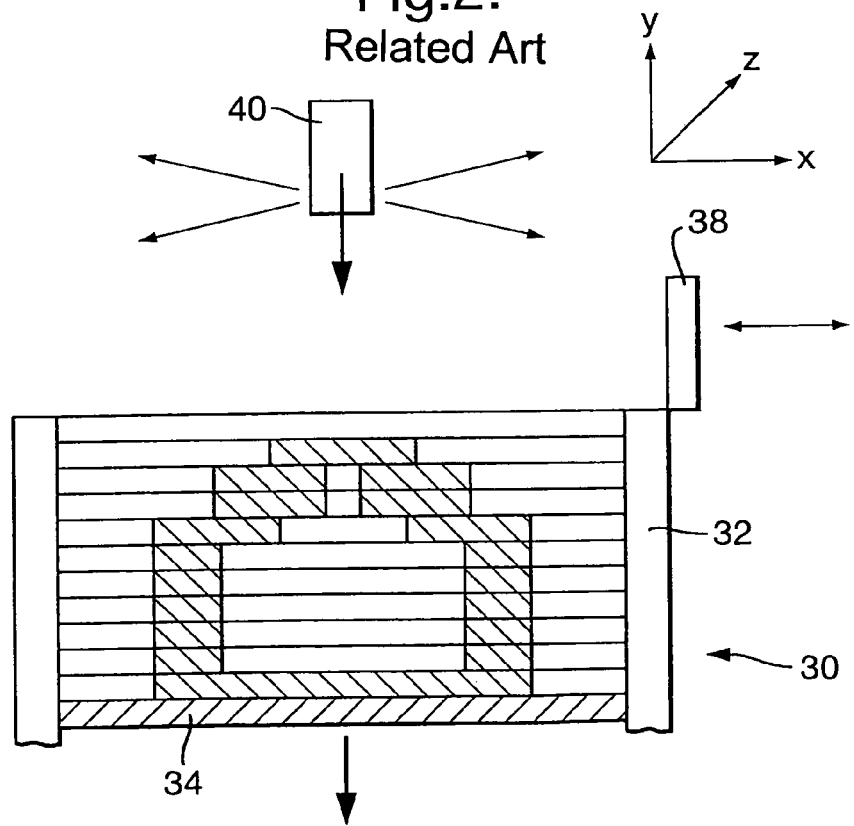
FIG. 2 depicts a method of depositing a component by powder bed processing.
Figure 3:
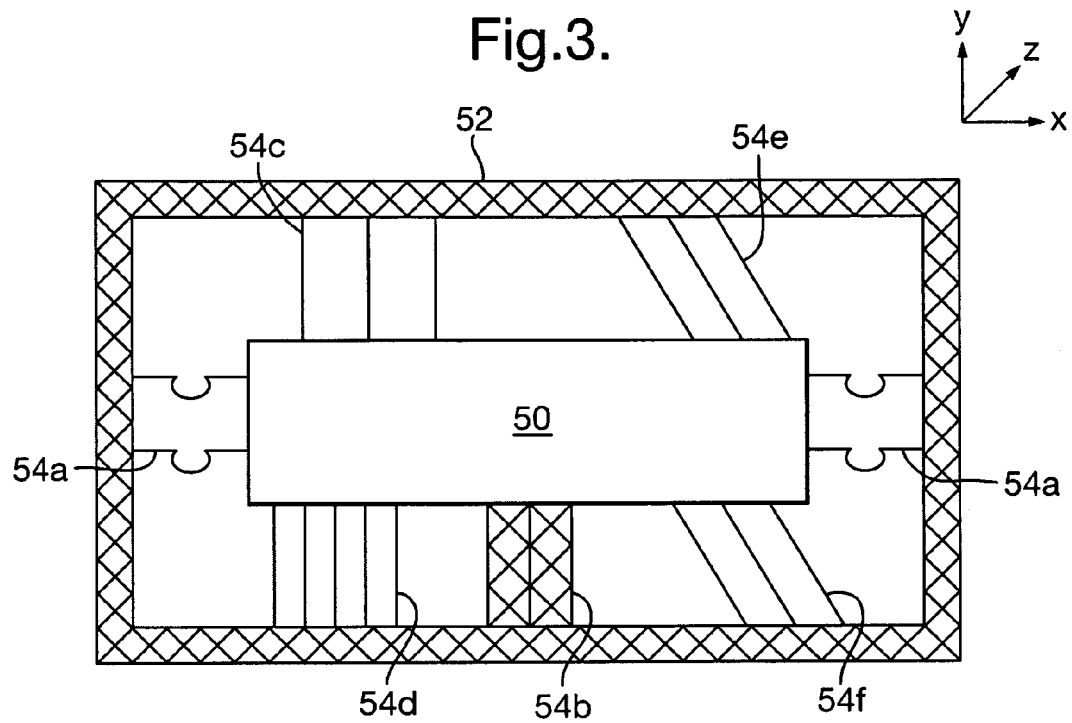
FIG. 3 depicts a support in accordance with the present invention.

According to the embodiment of the invention a frame 52 or support is built around the component 50 to be formed. The frame 52 is built integrally with the component using the same deposition method. One such frame is shown in FIG. 3 which shows a cross-section through a metal block 50 supported in frame 52 by a series of struts 54 arranged around the periphery of the block. It will be appreciated that the location and form of the struts, the location and form of the frame and the location and form of the component is merely exemplary and other forms, locations and materials other than those described in this description may be used.

The frame 52 extends around the component 50 and is connected thereto by the series of struts 54. The location, form and alignment of each of the struts is selected to provide stiffness or flexibility between the component and frame in one or more dimensions, with the thickness and orientation of each strut relative to the frame having a bearing on the magnitude of stiffness or flexibility afforded.

At least some of the struts connecting the component and the frame are in tension rather than compression. The use of lateral supports, which can act in a manner analogous to guy ropes for tents, assist in preventing thin walls from being deformed by the levelling blade or levelling roller in the powder bed process. The lateral supports offer the ability to support a greater variation of component form than vertical scaffolds.

To determine which form of strut is required at each location it is first necessary to calculate through modelling or empirical measurements the stresses observed by the component during manufacture or later treatment, where the frame is to be used as support for later machining or treatment operations.

The frame 52 has a truss arrangement which provides high rigidity and allows the struts to be firmly attached.

Strut 54a has the form of an Omega spring. The spring allows the component 50 to expand or contract in the x dimension with minimal resistance. Where the spring has significant length in the z dimension there is resistance to twisting of the component 50, perhaps caused by thermal treatment following manufacture.

Strut 54b has the form of a truss gridwork. The strut provides high stiffness in both the x and y dimensions and inhibits expansion or bending of component 50 particularly where frame 52 is constrained. Particularly the high stiffness strut is of use for inhibiting contraction of the article 50 as it cools following manufacture.

Struts 54c and 54d are linear and in the embodiment shown inhibit expansion or bending of component 50 particularly in the y dimension. The strut is, however, relatively flexible in the x direction and if in pillar form is also flexible in the z direction. Where the strut has a significant length it will resist twisting of the component in the z dimension.

Where the struts are provided in regions it is possible to provide them in differing quantities. The region having struts 54d have the struts provided in a greater concentration than the region of 54c, which gives a greater stiffness between the component and the frame in that region.

The struts 54e and 54f are arranged at an angle to the perpendicular between the component and the frame. These struts permit expansion in the x dimension while allowing twisting of the component in the y dimension.

Figure 4:
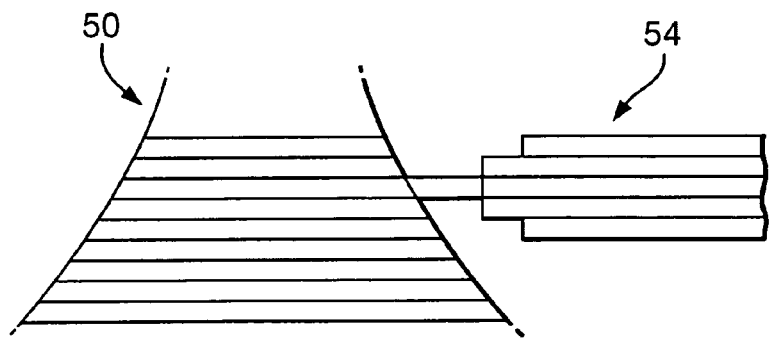
FIG. 4 depicts an attachment point between the support and the component.

The struts can be provided with weak points that simplify their detachment from the component 50. In one embodiment of this, shown in FIG. 4, the strut 54 is thinner at the point of contact with the component than elsewhere along its length. Alternatively, by pulsing the high energy beam it is possible to create partial fusion, or remove material by ablation to generate weak points, Whilst the invention has been described with respect to the x, y and z dimensions relative to the component in the embodiment it will be appreciated that the manufacturing machine or powder bed can have t, u and v axes that are independent of the x, y and z axes of the component. Indeed, requirements of the build process may mean that there is an advantageous effect of tilting samples in the bed, for example to minimise stubbing of the powder scraper blade.

It is also possible to provide the component, frame or struts with location features such as slots, clipping or clamping points which facilitate securing of pre-manufactured further structural elements to the component, frame or struts. The pre-manufactured structural elements may be machined relief features, bars, plates, wires, pins or dowels.

As mentioned above, it is possible for each of the struts to extend along all three dimensions to create a three dimensional lattice. The lattice may, for example, be corrugated or be an arrangement of undulating tubes or struts. Advantageously, solid freeform manufacture may be used to build supports that have a negative Poisson's ratio. These supports when stretched or compressed have a corresponding respective increase or decrease in their width.

After manufacture of the component both the frame and component can be removed from the powder bed or other manufacturing station as a unitary item and taken for post processing treatment. Beneficially, where smaller components are being manufactured, a number of individual components may be supported within a single frame which aids handling of these components particularly where they undergo similar post formation treatments. Additionally, it is possible to interconnect the multiple components with cross-braces which can stiffen the whole collection of attached components and reduce the permanent deformation of these components.

By modelling or measuring the stress within the component during the manufacture of the component or the post processing thereof it is possible to identify those areas which are liable to suffer from warping, stretching, cracking or other permanent deformation. The location of the support frame, struts or lattice work may then be selected to minimise the damage to the component.

It will be appreciated that the number of struts may be increased in a region of relative thinning in the component to remove heat by thermal conduction. By this method it is possible to control the principle axis of heat flux during formation or processing of the component. A dense structure of struts may be left around a component to create a local heat shield to protect the component and adjust residual stress patterns. With a short heat treatment cycle and/or a fast quench it is possible to create a local residual compression.

Where the frame remains in place during subsequent treatments the frame may be provided with a datum or locating feature to align the components within the machine.

If the post processing technique provides different stresses to the component than those during manufacture of the integral support and component it is possible to break one or more of the support struts to adjust the support provided to the component. For example, if the region of high stiffness 54b in FIG. 3 is required to provide support during the manufacture of the component 50 but its presence during the subsequent post processing stage is likely to create unwanted stress and risk of damage in the component 50, it is possible to remove all or some of the support offered by breaking any number of the connections 54b of the support with the component 50.

Preferably the breakage is made close to the component 50 using a laser or other appropriate cutting device to avoid having to re-machine the component to remove the support at the end. Electro-discharge machining is a further technique to remove the struts.

It will be appreciated that the invention offers a number of advantages. For example, no part specific tooling or fixturing is required as it is possible to size the frame for any given tool or fixture. The frame has a high surface area which aids the rate of heat input or cooling from the component.

The provision of flexible supports enables the manufacture of components on a baseplate having a different coefficient of thermal expansion or compression to the material of the component as the different expansion rates can be accommodated by the struts to avoid deformation of the component. Thus the use of a lower standard of baseplate is enabled to reduce cost.

The ability to control distortion of the component is important as powder bed and other solid freeform manufacturing techniques are used to manufacture larger components as the magnitude of thermal expansion will similarly increase.

Whilst the invention has been described primarily with respect to powder beds and particularly laser based powder beds it is equally applicable to other forms of powder bed e.g. electron beam based and other methods of high temperature solid freeform fabrication.

I claim:

1. A method of forming a metallic article from high temperature solid freeform fabrication, comprising:
    building a support for the metallic article during manufacture of the metallic article such that at least a portion of the metallic article is held in tension by the support, the support having an outer frame connected to the metallic article by struts, a stiffness of the support being selected to inhibit permanent thermal deformation of the metallic article from stresses induced in the high temperature solid freeform fabrication of the metallic article,
    wherein the metallic article undergoes a post-manufacture heat treatment, and the arrangement of the support is altered from a manufactured configuration of the support following manufacture of the metallic article by solid freeform fabrication to a post-manufacture heat treatment configuration of the support before undergoing the post-manufacture heat treatment, the arrangement of the support being altered by breaking at least a portion of one of the struts and retaining one or more of the struts to react stresses created during the post-manufacture heat treatment,
    wherein the post-manufacture heat treatment stresses are different than the stresses induced in the high temperature solid freeform fabrication of the metallic article.

2. A method of forming a metallic article from high temperature solid freeform fabrication, comprising:
    modeling or measuring a stress within a metallic article during post-manufacture processing following the high temperature solid freeform fabrication; and
    building a support for the metallic article during manufacture of the metallic article, the support comprising a frame connected to the metallic article by struts, locations of the struts being selected such that at least a portion of the metallic article is held in tension by the support and a stiffness the support provides to the metallic article is selected to inhibit permanent thermal deformation of the metallic article in the post-manufacture processing,
    wherein the struts comprise a member selected from the group consisting of omega springs, helical springs, and bow springs.

3. A method of forming a metallic article from high temperature solid freeform fabrication, comprising:
    modeling or measuring a stress within a metallic article during post-manufacture processing following the high temperature solid freeform fabrication; and
    building a support for the metallic article during manufacture of the metallic article, the support comprising a frame connected to the metallic article by struts, locations of the struts being selected such that at least a portion of the metallic article is held in tension by the support and a stiffness the support provides to the metallic article is selected to inhibit permanent thermal deformation of the metallic article in the post-manufacture processing,
    wherein the metallic article undergoes the post-manufacture processing in which the arrangement of the support is altered following manufacture of the metallic article by solid freeform fabrication and before the post-manufacture processing, the arrangement of the support being altered by breaking at least a portion of one of the struts.

4. A method according to claim 3, wherein the struts are provided in groups to provide supported regions in different locations around the metallic article.

5. A method according to claim 4, wherein a greater quantity of struts in a group gives a greater stiffness between the frame and a supported region of the metallic article.

6. A method according to claim 4, wherein a quantity of struts in at least one group is selected to control a heat flux from the metallic article during the at least one of the manufacture or the post processing of the metallic article.

7. A method according to claim 3, wherein the post-manufacture processing is heat treatment.

8. A method of forming a metallic article from high temperature solid freeform fabrication, comprising:
    building a support for the metallic article during manufacture of the metallic article, the support having an outer frame connected to the metallic article by struts such that at least a portion of the metallic article is held in tension by the support, a stiffness of the support being selected to inhibit permanent thermal deformation of the metallic article from stresses induced in the high temperature solid freeform fabrication of the metallic article,
    wherein the frame is built higher than the metallic article and at least one of the struts is built extending from a top surface of the metallic article to the frame,
    wherein the struts are omega springs.

9. A method of forming a metallic article from high temperature solid freeform fabrication, comprising:
    building a support for the metallic article during manufacture of the metallic article such that at least a portion of the metallic article is held in tension by the support, the support having an outer frame connected to the metallic article by springs,
    wherein the springs are omega springs.

10. A method of forming a metallic article from high temperature solid freeform fabrication, comprising:
    building a support for the metallic article during manufacture of the metallic article such that at least a portion of the metallic article is held in tension by the support, the support having an outer frame connected to the metallic article by springs.
    wherein the springs are helical or bow springs.

11. A method according to claim 9, wherein the outer frame is built higher than the metallic article and at least one strut is built extending from a top surface of the metallic article to the frame.

* * * * *